(12) United States Patent
Schrock et al.

(10) Patent No.: US 9,063,638 B1
(45) Date of Patent: Jun. 23, 2015

(54) USER INTERFACE FOR MEDIA THUMBNAILS

(75) Inventors: Jasson Schrock, Mountain View, CA (US); Geoff Stearns, San Francisco, CA (US)

(73) Assignee: Google Inc., Mountain View, CA (US)

( * ) Notice: Subject to any disclaimer, the term of this patent is extended or adjusted under 35 U.S.C. 154(b) by 725 days.

(21) Appl. No.: 12/251,392

(22) Filed: Oct. 14, 2008

Related U.S. Application Data

(60) Provisional application No. 60/979,593, filed on Oct. 12, 2007.

(51) Int. Cl.
  *G06F 3/048* (2013.01)
  *G06F 3/0484* (2013.01)

(52) U.S. Cl.
  CPC .................. *G06F 3/0484* (2013.01)

(58) Field of Classification Search
  USPC .......................................................... 715/838
  See application file for complete search history.

(56) References Cited

U.S. PATENT DOCUMENTS

| | | | |
|---|---|---|---|
| 6,166,735 A * | 12/2000 | Dom et al. | 715/749 |
| 6,973,628 B2 * | 12/2005 | Asami | 715/838 |
| 7,050,097 B2 * | 5/2006 | Schick et al. | 348/239 |
| 7,437,005 B2 * | 10/2008 | Drucker et al. | 382/224 |
| 2001/0028369 A1 * | 10/2001 | Gallo et al. | 345/848 |
| 2005/0160377 A1 * | 7/2005 | Sciammarella et al. | 715/838 |
| 2006/0161863 A1 * | 7/2006 | Gallo | 715/810 |
| 2008/0034013 A1 * | 2/2008 | Cisler et al. | 707/203 |
| 2008/0066013 A1 * | 3/2008 | Brodersen et al. | 715/836 |

\* cited by examiner

*Primary Examiner* — Peiyong Weng
(74) *Attorney, Agent, or Firm* — Fenwick & West LLP

(57) ABSTRACT

Video thumbnails are presented on the web page of a video hosting site, or an embedded player, or a client device. Uploaded videos are examined by a thumbnail generator, which generates thumbnails from each. A presentation engine displays the generated thumbnails, which allows interaction by the user of the client. Thumbnails are displayed at rest, in horizontal or vertical alignment. Arrows or other selectors are displayed in one embodiment, and when selected cause the displayed thumbnails to appear to move in the appropriate direction, with new video thumbnails appearing on one end to replace those that travel off-screen. In one embodiment, video thumbnails appear to roll on to and off of the display using a perspective view. In one embodiment, moving a selecting device over one of the video thumbnails causes it to be accentuated, for example by appearing to move toward the viewer and appearing to increase in size.

18 Claims, 16 Drawing Sheets

FIG. 4

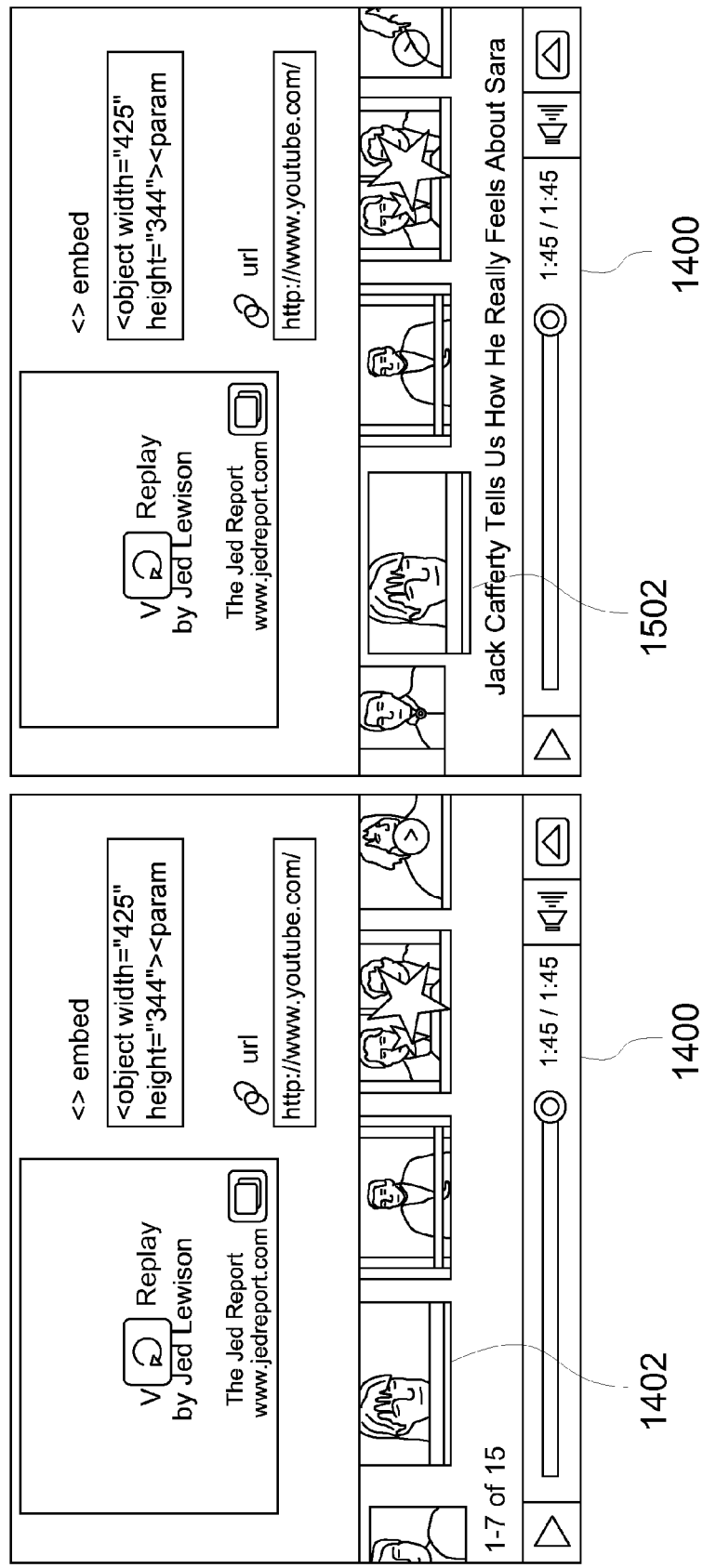

USER INTERFACE FOR MEDIA THUMBNAILS

CROSS-REFERENCE TO RELATED APPLICATIONS

This application claims the benefit of U.S. Provisional Application 60/979,593, filed on Oct. 12, 2007, and incorporated by reference herein in its entirety.

BACKGROUND

1. Field of the Invention

The present invention relates generally to a user interface for providing videos over a network. In particular, the present invention is directed to the presentation of video thumbnail images in a user interface.

2. Description of Related Art

In providing online content to users, one of the challenges faced by user interface designers is how to provide information about available media in a manner that is useful and attracts attention. One such type of content is video content, which is provided both directly by video hosting web sites, as well as through embedded video players on third party web sites.

SUMMARY

The present invention enables a user interface for presentation of video thumbnails. The thumbnails may be presented on the web page of a video hosting site, or in an embedded player located on a third party site, or on a client device. Videos uploaded to the video hosting site are examined by a thumbnail generator, which selects key frames of the video and generates thumbnails from each. A presentation engine displays the thumbnails associated with one or more videos on the web site, client device or embedded player, which allows interaction by the user of the client. In various embodiments, the thumbnails are displayed at rest, in horizontal or vertical alignment. Arrows or other selectors are displayed in one embodiment, and when selected cause the displayed thumbnails to appear to move in the appropriate direction, with new video thumbnails appearing on one end to replace those that travel off-screen on the other end. In one embodiment, video thumbnails appear to roll on to and off of the display using a perspective view. In one embodiment, moving a mouse or other selecting device over one of the video thumbnails causes it to be accentuated, for example by appearing to move toward the viewer and appearing to increase in size.

BRIEF DESCRIPTION OF THE DRAWINGS

FIG. 4 is a screen shot of a web page displaying video thumbnails in accordance with an embodiment of the present invention.

FIG. 14 and FIG. 15 illustrate a mouse-over effect in an embedded video player in accordance with an embodiment of the present invention.

The figures depict various embodiments of the present invention for purposes of illustration only. One skilled in the art will readily recognize from the following discussion that alternative embodiments of the instructions and methods illustrated herein may be employed without departing from the principles of the invention described here.

DETAILED DESCRIPTION OF THE PREFERRED EMBODIMENTS

Figure 1:
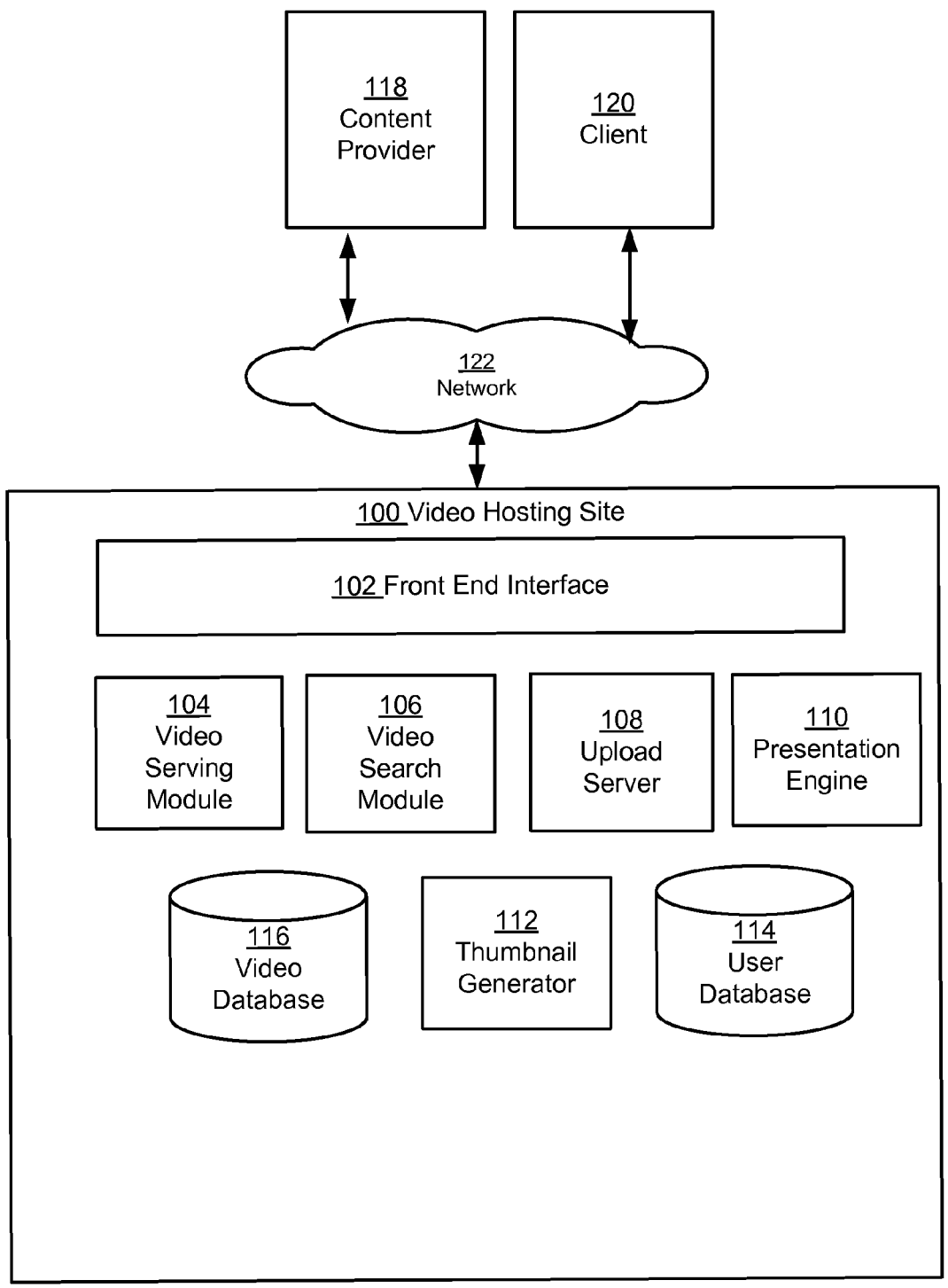
FIG. 1 is a block diagram of a system for providing media thumbnails in accordance with an embodiment of the present invention.

FIG. 1 is a block diagram of a video hosting site in accordance with an embodiment of the present invention. A video hosting website 100 communicates with a plurality of content providers 118 and client devices 120, via a network 122 to facilitate sharing of video content between users. Note that in FIG. 1, only one instance of content provider 118 and client 120 are shown; this is solely for clarity. The video hosting website 100 additionally includes a front end interface 102, video serving module 104, video search module 106, upload server 108, presentation engine 110, thumbnail generator 112, user database 114 and video content database 116. Other conventional features, such as firewalls, load balancers, authentication servers, application servers, failover servers, site management tools, and so forth are not shown so as to more clearly illustrate the features of the video hosting website 100. An example of a suitable website 100 is the YOUTUBE™ website, found at www.youtube.com. Other video hosting sites are known as well, and can be adapted to operate according to the teachings disclosed herein. The illustrated components of the video hosting website 100 can be implemented as single pieces of software or hardware or as multiple pieces of software or hardware. In general, functions described in one embodiment as being performed by one component, can also be performed by other components in other embodiments, or by a combination of components. Furthermore, functions described in one embodiment as being performed by components of the video hosting website 100 can also be performed by one or more clients 120 in other embodiments if appropriate.

Client devices 120 execute client software, e.g., a web browser or built-in client application, to connect to front end interface 102 of the video hosting site 100 via a network 122. The network 122 is typically the Internet, but may be any network, including but not limited to a LAN, a MAN, a WAN, a mobile wired or wireless network, a private network, or a virtual private network. Client device 120 may comprise a personal computer or other network-capable device such as a personal digital assistant (PDA), a mobile telephone, a pager, a television "set-top box," etc.

Conceptually, content provider 118 provides video content to video hosting site 100 and client 120 views that content. In practice, content providers may also be content viewers. Additionally, content provider 118 may be the same entity that operates video hosting site 100.

Content provider 118 operates a client device to perform various content provider functions. Content provider functions may include, for example, uploading a video file to the video hosting website 100, editing a video file stored by the video hosting website 100, or editing content provider preferences associated with a video file.

Client 120 operates on device to view video content stored by the video hosting site 100. Client 120 may also be used to configure viewer preferences related to video content. In some embodiments, the client 120 includes an embedded video player such as, for example, the Flash™ player from Adobe Systems, Inc. or any other player adapted for the video file formats used in the video hosting website 100. Note that we use client and content provider to refer both to the software performing the client and content providing functions as well as to the entities operating the software, as is apparent from the context.

Upload server 108 receives video content from a client 120. Received content is stored in video database 116. Thumbnail generator 112 determines, for each item of video content, one or more thumbnail images to associate with the item of video content. Presentation engine 110 presents thumbnails to a client viewer 120 in the manner described further below. Front end interface 102 provides the interface between client 120 and the various components of video hosting site 100.

Figure 2:
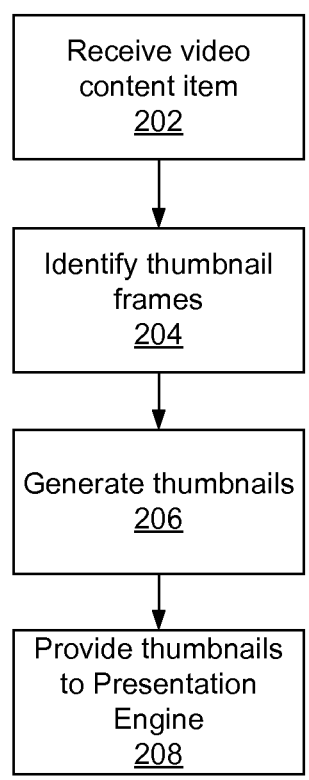
FIG. 2 is a flowchart illustrating a method for generating video thumbnails in accordance with an embodiment of the present invention.

In one embodiment, and referring to FIG. 2, after video content is received by upload server 108, it is analyzed by thumbnail generator 112. Thumbnail generator 146 receives 202 as input an item of video content and returns one or more thumbnails associated with that content. Thumbnail generator 146 selects 204 frames, also known as key frames, from which to generate thumbnails in one or more of a variety of ways. In one embodiment, for example, thumbnails are generated at regular intervals, e.g., every 10 seconds of video. In other embodiments, for example, scene detection is used to identify when a scene changes, and a new thumbnail is generated for each scene. Other thumbnail generation algorithms may be used in alternative embodiments. Once the thumbnails have been generated 206, they are stored in video database 116 in association with the video from which they are taken, and are then available 208 to components of video hosting site 100, including presentation engine 110.

Figure 3:
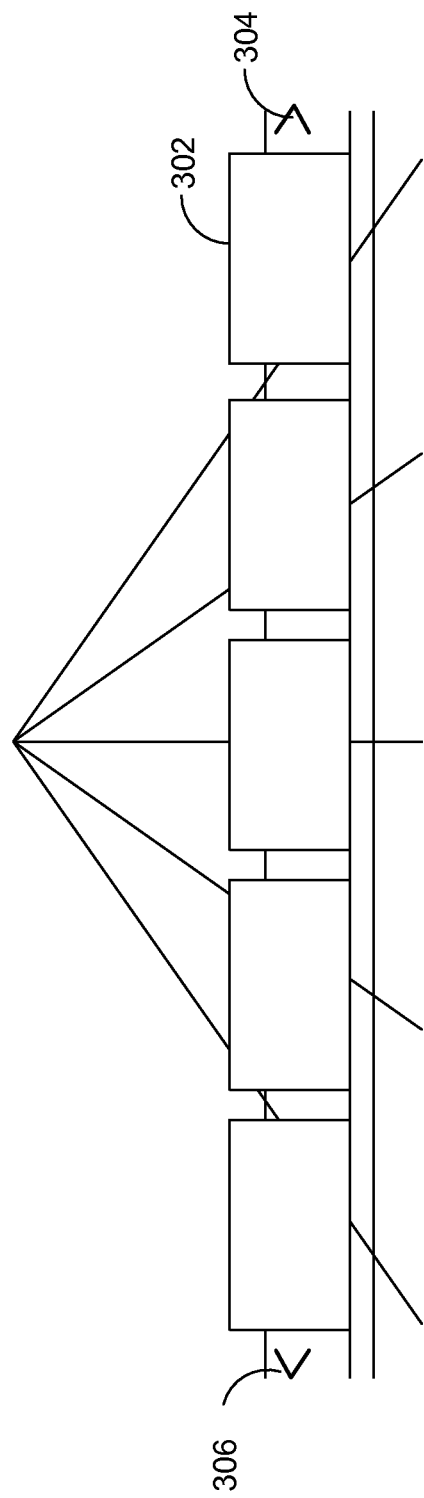
FIG. 3 illustrates a layout of a user interface displaying media thumbnails in accordance with an embodiment of the present invention.
Figure 4:
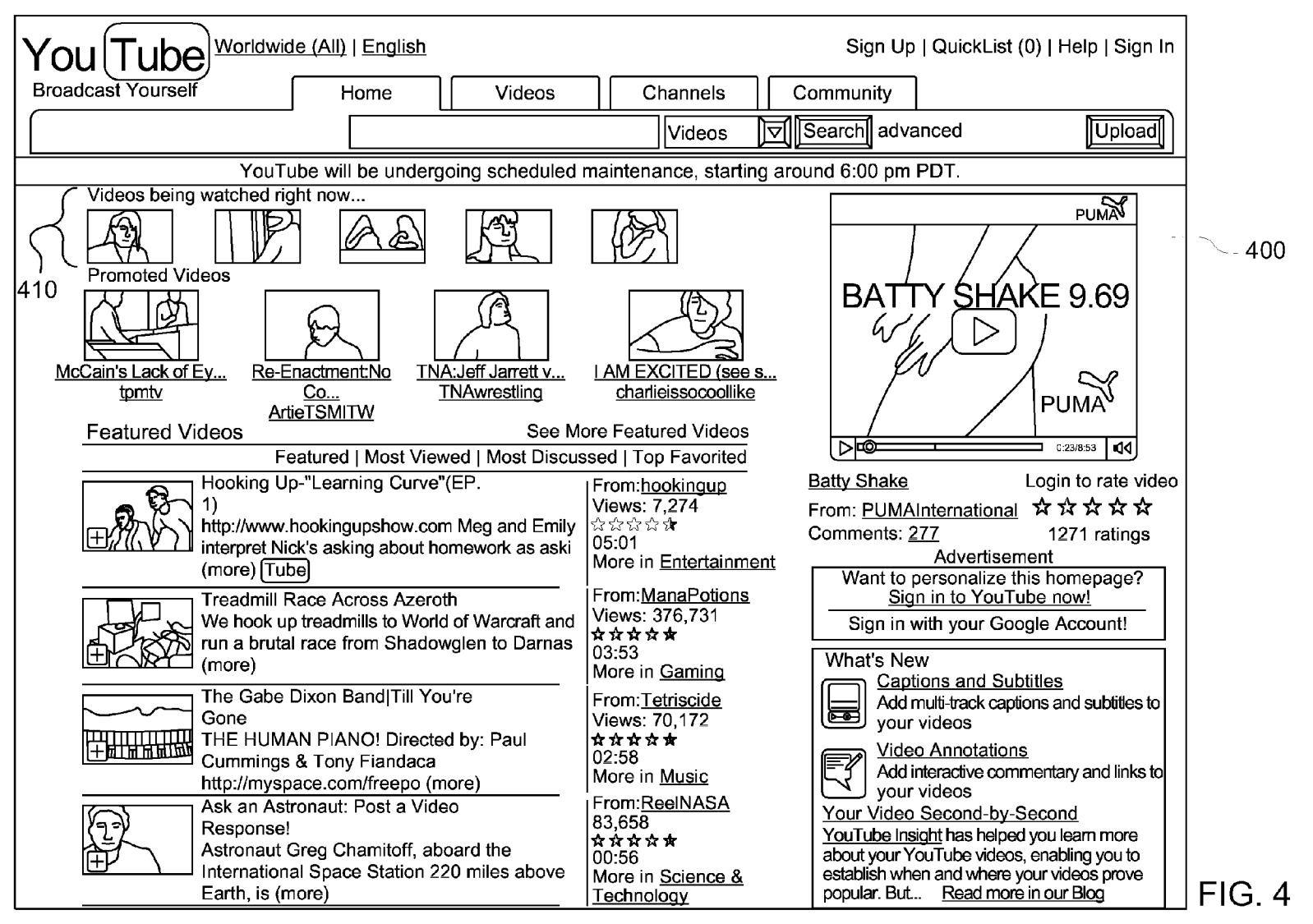

FIG. 3 illustrates a layout of a user interface displaying media thumbnails in accordance with an embodiment of the present invention. In FIG. 3, thumbnails 302 are displayed at rest (i.e. when no user action has occurred). The displayed key frames may be, for example, the first frame of a video, or another frame representative of the media content. In one embodiment, the set of thumbnails are representative of a plurality of videos, such as recommended videos or videos on a video playlist (e.g., a predefined set or sequence of videos) with each thumbnail corresponding to an individual media file. In another embodiment, the thumbnails may correspond to any arbitrary set of media files provided by a media server. FIG. 4 is a screen shot of a web page 400 that includes such a display of video thumbnails 410.

In one embodiment, the display includes a right scroll arrow 304 and a left scroll arrow 306. The scroll arrows 304, 306 can be used to cause new sets of thumbnails to be displayed such as, for example, thumbnails for related, recommended, or similar media content. When the right scroll arrow 304 is clicked, presentation engine 110 causes the current thumbnails to slide out of view to the left while the new set of thumbnails is loaded and slides in to view from the right. Similarly, when the left arrow is clicked, the current thumbnails slide out of view to the right and the new set of thumbnails is loaded and slides into view from the left.

Figure 5:
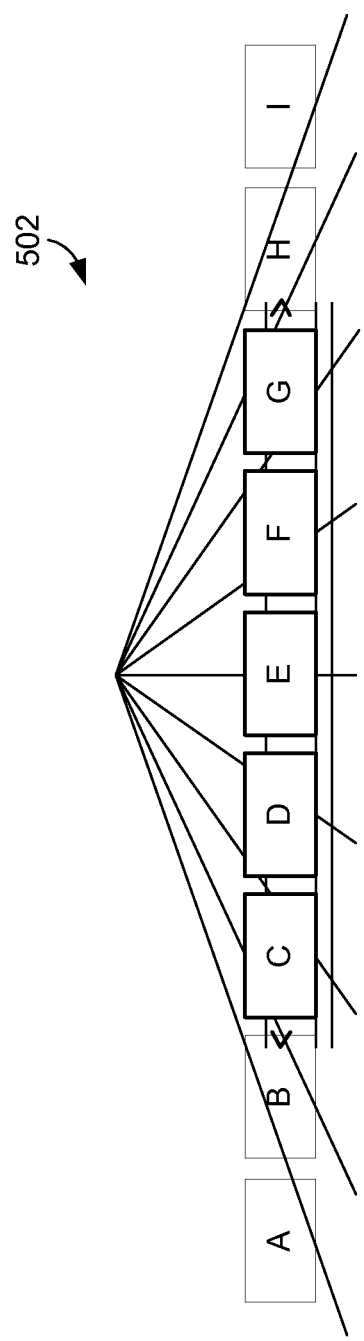
FIG. 5 illustrates a set of thumbnails within a viewing window in accordance with an embodiment of the present invention.

Turning now to FIG. 5, a set of thumbnails is illustrated within a viewing window 502. The viewing window may be, for example, a display area within a user interface of an embedded player or a portion of a website that is displayed. If the set of videos includes more videos than the number of thumbnails shown in the viewing window 502, presentation engine 110 responds to indications of movement of a pointing device (e.g., a mouse) by changing the thumbnails that are displayed. For example, in FIG. 5, a set of thumbnails is comprised of thumbnails A-I, but only thumbnails C-G are displayed in the viewing window 502. The user can cause thumbnails A-B or H-I to be displayed by moving the pointer as is described below with reference to FIGS. 6, 7 and 8.

Figure 6:
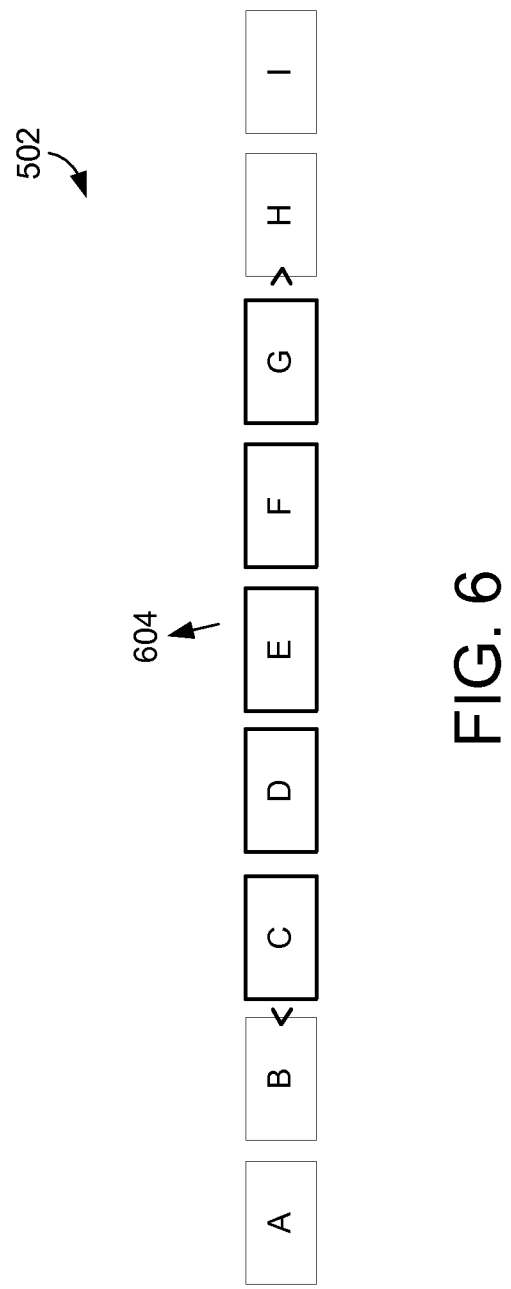
FIG. 6 illustrates a display of thumbnails in a viewing window in accordance with an embodiment of the present invention.
Figure 7:
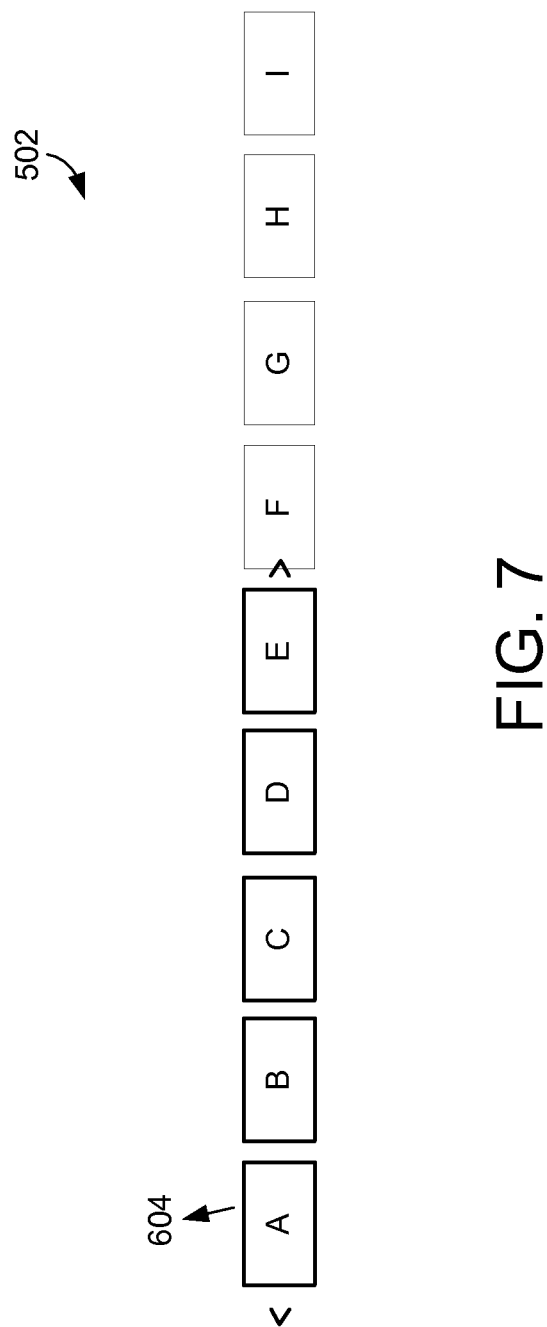
FIG. 7 illustrates a display of thumbnails in a viewing window in accordance with an embodiment of the present invention.
Figure 8:
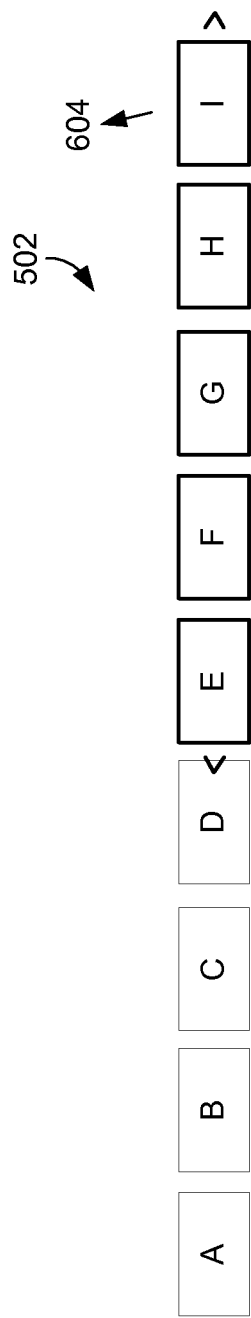
FIG. 8 illustrates a display of thumbnails in a viewing window in accordance with an embodiment of the present invention.

FIG. 6 illustrates the set of thumbnails displayed in the viewing window 502 when the pointer 604 is approximately centered in the viewing window 502. Here, the middle five thumbnails C-G are displayed in the viewing window 502 while the outer two thumbnails on each end A-B and H-I are not displayed. FIG. 7 illustrates the display of thumbnails when the user moves the pointer 604 to the left side of the viewing window 502. The user interface tracks the pointer movement and scrolls the thumbnails so that thumbnails A-E are now displayed and thumbnails F-I are not displayed. FIG. 8 illustrates the thumbnail display when the user moves the pointer 604 to the right side of the user interface window 502. Now, the thumbnails scroll in the opposite direction and thumbnails E-I are displayed and thumbnails A-D are not displayed. In one embodiment, thumbnails move continuously over time as the mouse moves to provide a scrolling effect.

Figure 9:
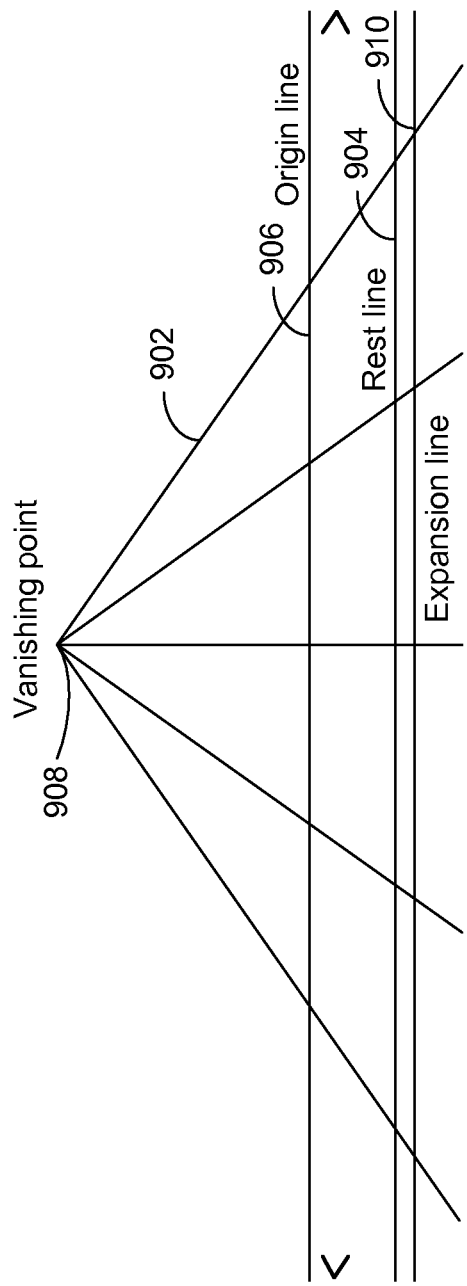
FIG. 9 illustrates a set of guides used to create a perspective view of video thumbnails in accordance with an embodiment of the present invention.

In one embodiment, the display of thumbnails also changes according to various other actions such as, for example, when the user interface or website containing the thumbnails is first loaded, when the user moves the pointer over a thumbnail, when the user selects a video to play, or when the thumbnails are to be hidden. FIG. 9 illustrates a set of guides used to align the thumbnail display according to different actions. The rest line 904 indicates the position of the thumbnails at rest when no action is occurring such as, for example, in FIG. 3. The origin line 906 indicates a starting point that thumbnails move away from when initially revealed (such as, for example, when the user interface is first loaded) as is described below with reference to FIG. 10. The expansion line 910 indicates a position that a thumbnail moves to when the pointer is rolled over the thumbnail as is described below with reference to FIG. 12. Guidelines 902 are drawn away from a vanishing point 908 and through the origin line 906, rest line 904, and expansion line 910. These guidelines 902 are used in various thumbnail movements as is described below with reference to FIG. 10 and FIG. K. The set of guides (vanishing point, origin line, rest line, expansion line, and guideline) are merely references used herein to describe the positions and movement of the thumbnail display. The guides are not actually displayed to the user as part of the user interface.

Figure 10:
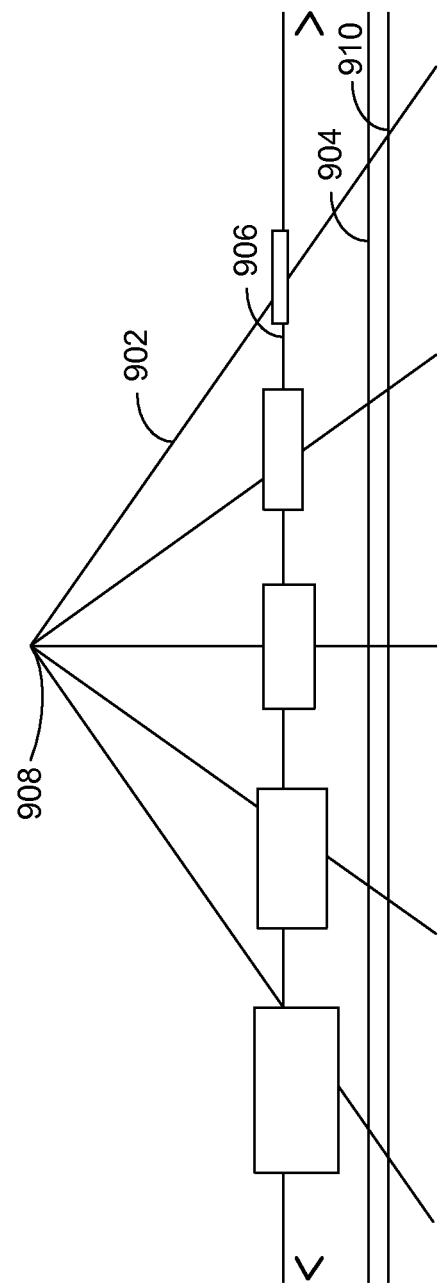
FIG. 10 illustrates the rolling in of video thumbnails in accordance with an embodiment of the present invention.
Figure 11:
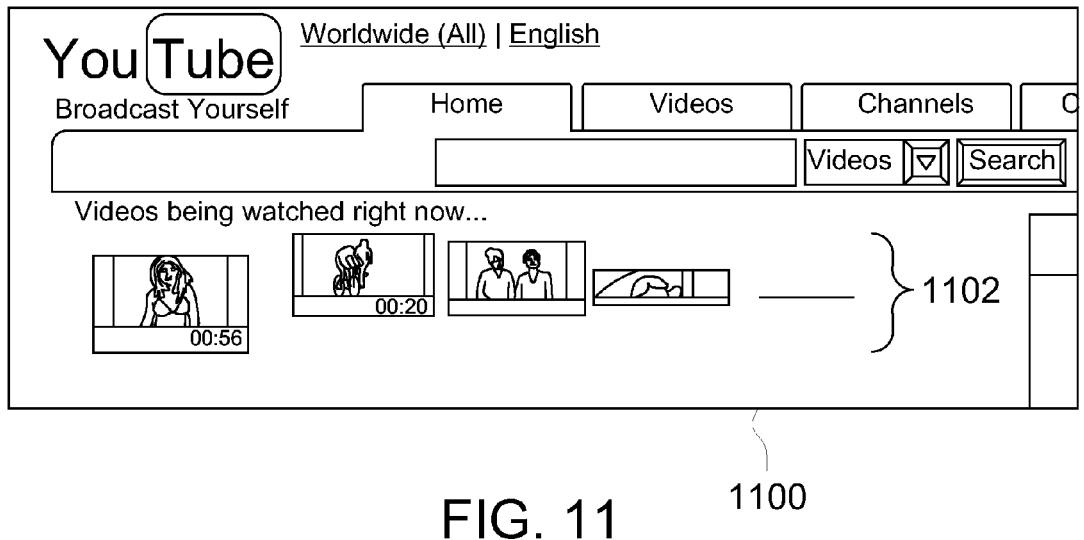
FIG. 11 illustrates the rolling in of video thumbnails in accordance with an embodiment of the present invention.

In one embodiment, thumbnails are not immediately displayed when the user interface or website is initially loaded. Instead, the thumbnails are "rolled-in" over time. An example of this roll-in behavior is illustrated in FIG. 10 and described below. In the example, each thumbnail appears by rising from the origin line over time and scaling proportionally larger to the rest line while following a path along the guidelines 902 away from the vanishing point. FIG. 10 illustrates a snapshot in time of the thumbnail movement with each thumbnail in various positions. In one embodiment, each thumbnail begins to appear at different times. For example, as illustrated FIG. 10, the thumbnail on the left begins to rise from the origin line at a first time, the next thumbnail begins to rise after a predetermined amount of time, and so on until all thumbnails are completely revealed and positioned at the rest line (as illustrated in FIG. 3). It is noted that other variations of roll-in behavior are also possible without departing from the scope of the invention. The predetermined amount of time may be any time deemed suitable by the implementer. FIG. 11 illustrates a second screenshot of video thumbnails being "rolled" in and displayed in a region 1102 of a web page 1100.

In one embodiment, the roll-in effect described above automatically repeats after a predetermined period of time to display a new set of thumbnails. For example, a user interface for an embedded video player or a website may automatically roll-in a new set of thumbnails to replace the existing set of thumbnails every 5 seconds. In another embodiment, new sets of thumbnails are rolled in when an update becomes available or upon a user request. For example, a website may display a set of thumbnails representing videos that are currently being viewed by other users. The website can periodically roll in an updated set of thumbnails representing an updated set of currently-viewed videos after a predetermined time period, when an update becomes available, or when a user requests an updated thumbnail set. In one embodiment, a roll-out or thumbnail hiding effect is applied to the currently displayed thumbnails prior to rolling in the new set of thumbnails. An example of thumbnail hiding behavior is described below with reference to FIG. 16.

Figure 13:
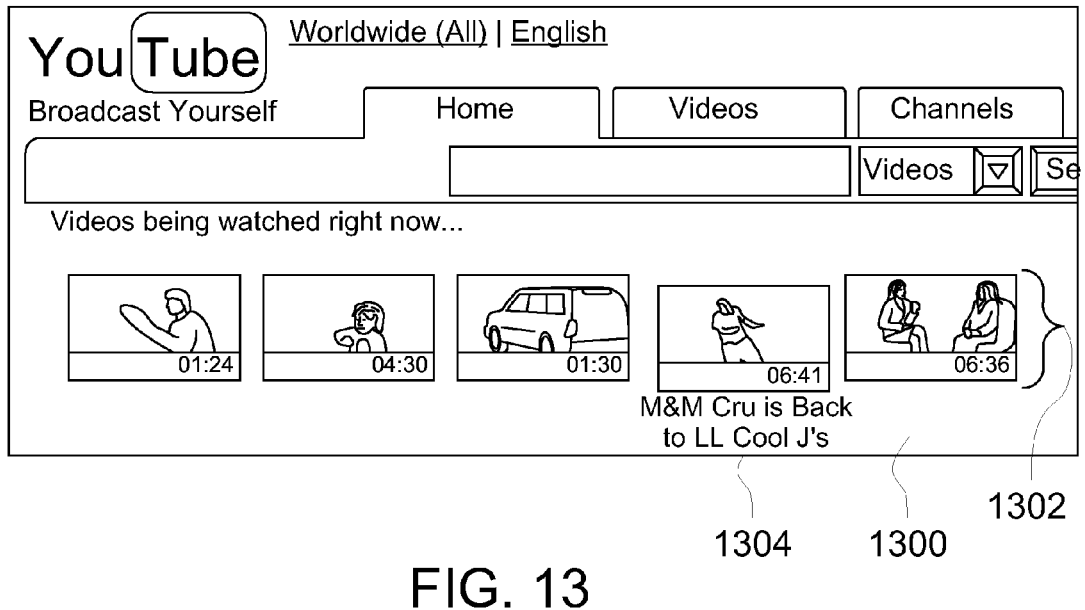
FIG. 13 illustrates a screen shot of a web page in which a thumbnail is moved forward with respect to other thumbnails in accordance with an embodiment of the present invention.
Figure 12:
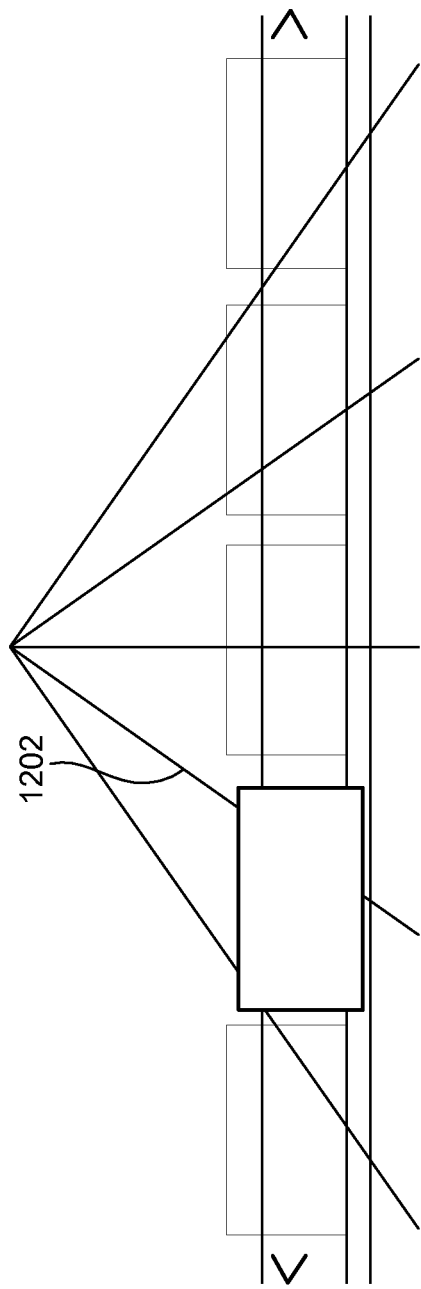
FIG. 12 illustrates movement of a thumbnail in response to a selecting device in accordance with an embodiment of the present invention.

FIG. 12 illustrates movement of a thumbnail when the pointer or other selecting device moves over the thumbnail. Here, as illustrated for the second thumbnail from the left, when the pointer moves over the thumbnail, the thumbnail moves from the rest line to the expansion line while following a path along the guideline 1202 through the thumbnail away from the vanishing point. In one embodiment, the remaining thumbnails fade out and/or darken slightly. When the pointer moves off the thumbnail, the thumbnail moves back to the rest line. In one embodiment, the thumbnail being moused over is displayed in a distinctive way, such as brightening the colors, making a black and white thumbnail show up in color, or making a color thumbnail show up in black and white. In one embodiment, a distinctive border is displayed around the thumbnail being moused over. In one embodiment, some other mechanism is used to determine that the thumbnail should change. For example, the thumbnail may be selected by clicking on it instead of by mousing over. FIG. 13 illustrates a screen shot of a web page 1300 in which a thumbnail 1304 is moved forward with respect to the other video thumbnails in region 1302 in response to a mouseover. FIGS. 14 and 15 illustrate a video 1402, 1502 accentuated by a similar mouseover effect provided in an embedded video player 1400, in accordance with some embodiments. In some embodiments, the illustrated thumbnails scroll across the screen in response to mouse movement—for example, moving the mouse towards the left edge of the displayed thumbnails causes the thumbnails to move to the right—the rightmost thumbnail thus leaving the screen, and a new thumbnail appearing from the left. In alternative embodiments, the thumbnails scroll in the same direction of travel as the mouse.

Figure 16:
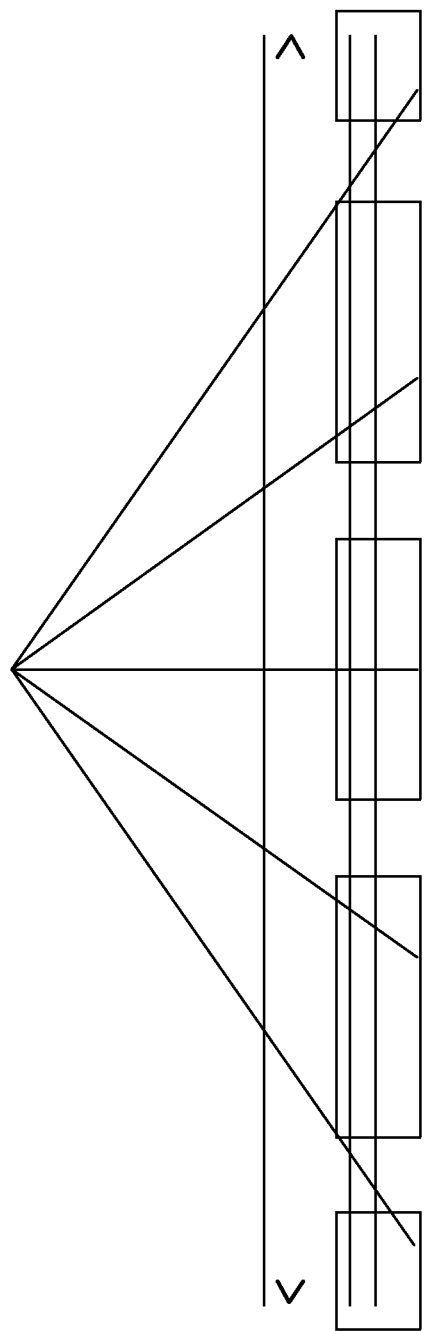
FIG. 16 illustrates movement of a thumbnail during thumbnail hiding in accordance with an embodiment of the present invention.
Figure 17:
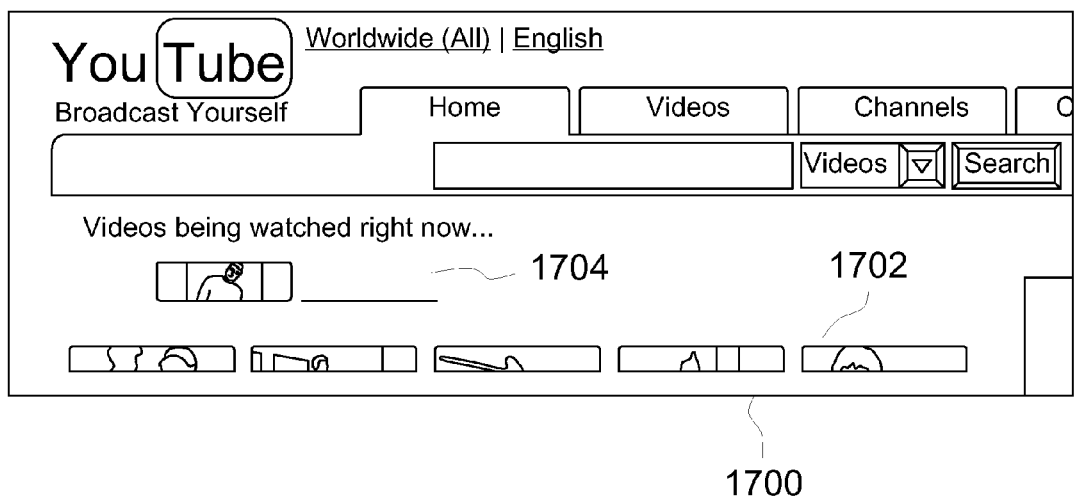
FIG. 17 illustrates a screen shot of a web page in which thumbnails are being rolled out while other thumbnails are being rolled in, in accordance with an embodiment of the present invention.

FIG. 16 illustrates movement of thumbnail during thumbnail hiding. Thumbnails may be hidden when, for example, the user selects a video for viewing, when the user manually requests to hide the thumbnail display, or prior to new thumbnails being "rolled-in" as described above. Here, the thumbnails proportionally scale larger while following their respective guideline paths away from the vanishing point until they are off the screen. In one embodiment, the thumbnails also fade-out during the hiding sequence. FIG. 17 illustrates a screen shot of a web page 1700 in which thumbnails 1702 are being rolled out while new thumbnails 1704 are being rolled in.

Figure 18:
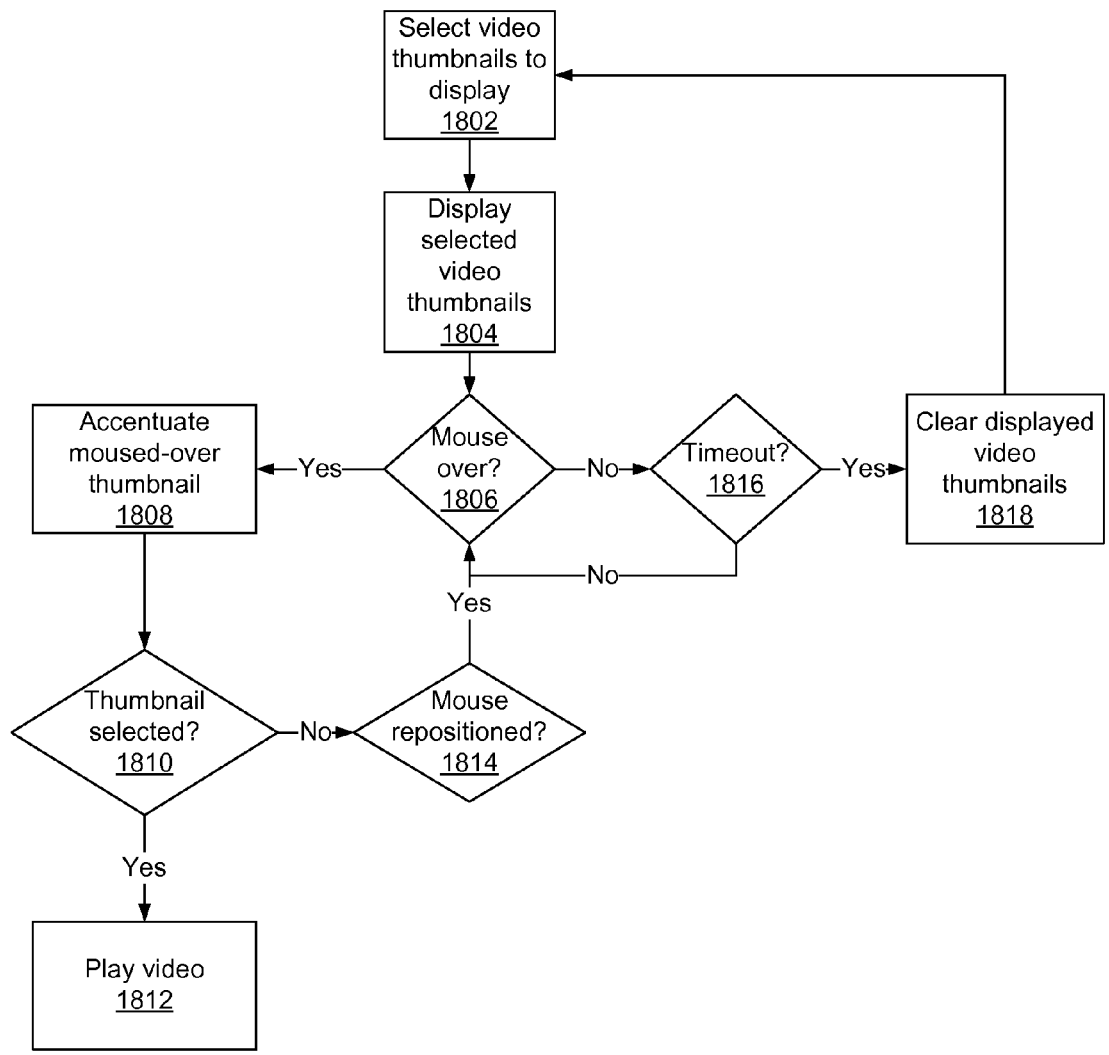
FIG. 18 illustrates a method for providing video thumbnails in accordance with an embodiment of the present invention.

FIG. 18 illustrates a method for providing video thumbnails in accordance with an embodiment of the present invention. Presentation engine 110 selects 1802 video thumbnails to display, based on criteria described above, e.g., relatedness, search criteria, favorites, playlists, and the like. The selected thumbnails are then displayed 1804 to a client 120. If 1806 client 120 causes a mouseover of one of the thumbnails, then presentation engine 110 accentuates 1808 the moused-over thumbnail as described above. If 1810 the moused-over thumbnail is selected, e.g., by clicking on it, then the video is played 1812 at the client 120. Otherwise, if the mouse is repositioned 1814 to mouseover a different video, the steps are repeated as just described. If 1806 no mouseover occurs within a given time, a timeout occurs 1816, and presentation engine 110 clears 1818 the displayed videos, e.g., by rolling the thumbnails off the screen, and selects 1802 a new set of video thumbnails to display.

The present invention has been described in particular detail with respect to a limited number of embodiments. Those of skill in the art will appreciate that the invention may additionally be practiced in other embodiments.

Within this written description, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead be performed by a single component.

Some portions of the above description present the feature of the present invention in terms of algorithms and symbolic representations of operations on information. These algorithmic descriptions and representations are the means used by those skilled in the art to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the present discussion, it is appreciated that throughout the description, discussions utilizing terms such as "selecting" or "computing" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, DVDs, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter.

Accordingly, the disclosure of the present invention is intended to be illustrative, but not limiting, of the scope of the invention.

We claim:

1. A computer-implemented method for providing video thumbnails in a user interface, the method comprising:
   receiving a plurality of video content items;
   determining related video content items for respective videos within the plurality of video content items;
   generating at least one thumbnail associated with respective ones of the plurality of video content items;
   displaying a first set of the generated thumbnails in a user interface, each displayed thumbnail having a first displayed size and a first position in the user interface along a linear rest line, the first positions of each thumbnail disposed along a corresponding linear path emanating from a common vanishing point located separate from the linear rest line;
   receiving a first selection of a thumbnail from within the first set of displayed thumbnails;
   responsive to the selection, displaying the first selected thumbnail at a second position and second displayed size in the user interface, the second position of the first selected thumbnail farther away from the common vanishing point than the first position and the first selected thumbnail scaled relative to the other displayed thumbnails to appear closer to a viewer of the user interface than the other displayed thumbnails, the other displayed thumbnails displayed at their first displayed sizes and their first displayed positions, wherein the first position and the second position of the first selected thumbnail are disposed along the corresponding linear path emanating from the common vanishing point and the first selected thumbnail is scaled relative to a distance traveled along the corresponding linear path from the first position on the corresponding linear path to the second position on the corresponding linear path;
   responsive to an indication that the first selected thumbnail is no longer selected, displaying the first selected thumbnail at the first position and first displayed size;
   receiving a second set of thumbnails, each thumbnail in the second set of thumbnails representing a video content item related to at least one video content item represented by the first set of thumbnails; and
   after a predetermined period of time, displaying each of the second set of thumbnails at the first displayed size and third positions along the linear rest line in the user interface, wherein the second set of thumbnails rise from a linear origin line while following corresponding linear paths emanating from the common vanishing point to the third positions along the linear rest line and scale proportionally larger to the first displayed sizes.

2. The method of claim 1 wherein the plurality of video content items are received by a video hosting site.

3. The method of claim 1 wherein the user interface is displayed on a web page of a video hosting site.

4. The method of claim 1 wherein the user interface is displayed on a web page of a site other than a video hosting site.

5. The method of claim 4 wherein the user interface includes an embedded video player.

6. The method of claim 1 wherein generating the first set of thumbnails further comprises:
   animating the appearance of a first thumbnail of the generated thumbnails at a first time; and
   animating the appearance of each subsequent generated thumbnail at a subsequent time.

7. The method of claim 6 wherein animating the appearance of a video thumbnail further comprises:
   displaying a first portion of the thumbnail at a first location; and
   displaying a second portion of the thumbnail at a second location, the second portion including the first portion, the second location and the first location defining a line originating at a vanishing point, and the second location farther from the vanishing point than the first location.

8. The method of claim 1 further comprising displaying the first selected thumbnail at a second size, the second size larger than the first size.

9. A computer program product for providing video thumbnails in a user interface, the computer program product comprising a non-transitory computer readable medium, the computer readable medium having computer executable code for performing the steps of:
   receiving a plurality of video content items;
   determining related video content items for respective videos within the plurality of video content items;
   generating at least one thumbnail associated with respective ones of the plurality of video content items;
   displaying a first set of the generated thumbnails in a user interface, each displayed thumbnail having a first displayed size and a first position in the user interface along a linear rest line, the first positions of each thumbnail disposed along a corresponding linear path emanating from a common vanishing point separate from the linear rest line;
   receiving a first selection of a thumbnail from within the first set of displayed thumbnails;
   responsive to the first selection, displaying the first selected thumbnail at a second position and second displayed size in the user interface, the second position of the first selected thumbnail farther away from the common vanishing point than the first position and the first selected thumbnail scaled relative to the other displayed thumbnails to appear closer to a viewer of the user interface than the other displayed thumbnails, the other displayed thumbnails displayed at their first displayed sizes and their first displayed positions, wherein the first position and second position of the first selected thumbnail are disposed along the corresponding linear path emanating from the common vanishing point and the first selected thumbnail is scaled relative to a distance traveled along the corresponding linear path from the first position on the corresponding linear path to the second position on the corresponding linear path;
   responsive to an indication that the first selected thumbnail is no longer selected, displaying the first selected thumbnail at the first position and first displayed size;
   receiving a second set of thumbnails, each thumbnail in the second set of thumbnails representing a video content item related to at least one video content item represented by the first set of thumbnails; and
   after a predetermined period of time, displaying each of a second set of thumbnails at the first displayed size and third positions along the linear rest line in the user interface, wherein the second set of thumbnails rise from a linear origin line while following corresponding linear paths emanating from the common vanishing point to the third positions along the linear rest line and scale proportionally larger to the first displayed sizes.

10. A system for providing video thumbnails in a user interface, comprising:
    at least one hardware processor;
    a thumbnail generator, executed by the processor and adapted to receive a plurality of video content items;
    a presentation engine, coupled to the thumbnail generator and executed by the processor, adapted to:
      display a first plurality of the generated thumbnails in a user interface associated with respective ones of a first subset of the plurality of video content items;
      position each of the first plurality of the generated thumbnails in first positions along a linear rest line, the first positions of each thumbnail disposed along a corresponding linear path emanating from a common vanishing point located separate from the linear rest line;
      receive a first selection of one of the first plurality of displayed thumbnails;
      display the first selected thumbnail at a second position and second displayed size in the user interface, the second position of the first selected thumbnail farther away from the common vanishing point than the first position and the first selected thumbnail scaled relative to the other displayed thumbnails to appear closer to a viewer of the user interface than the other displayed thumbnails, the other displayed thumbnails displayed at their first displayed size and their first displayed positions, wherein the first position and the second position of the first selected thumbnail are disposed along the corresponding linear path emanating from the common vanishing point and the first selected thumbnail is scaled relative to a distance traveled along the corresponding linear path from the first position on the corresponding linear path to the second position on the corresponding linear path;
      responsive to an indication that the first selected thumbnail is no longer selected, to display the first selected thumbnail at the first position and first displayed size;
      select a second plurality of thumbnails associated with respective ones of a second subset of the plurality of video content items, each thumbnail in the second plurality of thumbnails representing a video content item related to at least one video content item represented by the first plurality of thumbnails; and
      after a predetermined period of time, display each thumbnail in the second plurality of thumbnails at the first displayed size and third positions along the linear rest line in the user interface, wherein the second plurality of thumbnails rise from a linear origin line while traveling corresponding linear paths emanating from the common vanishing point to the third positions along the linear rest line and scale proportionally larger relative to distance traveled along the corresponding linear paths to the first displayed sizes.

11. The computer program product of claim 9 wherein the plurality of video content items are received from a video hosting site.

12. The computer program product of claim 9 wherein the user interface further comprises an embedded video player.

13. The computer program product of claim 9 wherein the user interface is displayed on a web page of a site other than a video hosting site.

14. The computer program product of claim 13 wherein the user interface includes an embedded video player.

15. The computer program product of claim 9 wherein generating the first set of thumbnails further comprises:
    animating the appearance of a first thumbnail of the generated thumbnails at a first time; and
    animating the appearance of each subsequent generated thumbnail at a subsequent time.

16. The computer program product of claim 15 wherein animating the appearance of a video thumbnail further comprises:
- displaying a first portion of the thumbnail at a first location; and
- displaying a second portion of the thumbnail at a second location, the second portion including the first portion, the second location and the first location defining a line originating at a vanishing point, and the second location farther from the vanishing point than the first location.

17. The system of claim 10 wherein the thumbnail generator is adapted to receive the plurality of video content items from a video hosting site.

18. The system of claim 10 wherein the user interface further comprises an embedded video player.

* * * * *